United States Patent [19]

Schuplin

[11] 3,756,115

[45] Sept. 4, 1973

[54] PLASTIC RIVET

[75] Inventor: Jerome T. Schuplin, Parma Heights, Ohio

[73] Assignee: Fastway Fasteners, Inc., Lorain, Ohio

[22] Filed: Dec. 3, 1971

[21] Appl. No.: 204,427

[52] U.S. Cl. .................................................. 85/5 R
[51] Int. Cl. ............................................ F16b 21/08
[58] Field of Search .................. 85/5 R, 80, DIG. 2; 24/73 P, 73 PF, 73 PM, 73 PB; 248/71

[56] References Cited
UNITED STATES PATENTS

| 3,550,219 | 12/1970 | Van Buren | 24/73 PB |
| 3,552,696 | 1/1971 | Orenick | 248/71 |
| 2,104,239 | 1/1938 | Place | 85/5 R |
| 2,229,996 | 1/1941 | Churchill | 85/5 R |
| 2,420,826 | 5/1947 | Irrang | 85/DIG. 2 |
| 2,531,911 | 11/1950 | Johnson | 85/5 R |
| 2,788,047 | 4/1957 | Rapata | 85/80 |
| 2,936,805 | 5/1960 | Rice | 85/5 R |
| 2,956,605 | 10/1960 | Rapata | 85/50 |
| 3,424,051 | 1/1969 | Baugh | 85/5 R |
| 3,574,899 | 4/1971 | Fisher | 85/80 |

FOREIGN PATENTS OR APPLICATIONS

| 246,388 | 8/1963 | Australia | 85/5 R |
| 2,049,476 | 4/1971 | Germany | 85/5 R |

Primary Examiner—Edward C. Allen
Attorney—Isler & Ornstein

[57] ABSTRACT

A plastic rivet is disclosed having a head and a shank, comprising portions which are separated from each other by a relatively wide slot which extends from near the head of the rivet to near the end of the shank and which facilitates entry of the shank into holes in panels which are to be secured together by the rivet. Such entry is further facilitated by reason of the provision of flattened surfaces on the shank portions which extend perpendicularly to the walls of said slot, and by the conical conformation of the ends of the shank portions. The holding power of the rivet is increased by the provision of angled shoulders or lands at the upper ends of said conical conformations.

4 Claims, 11 Drawing Figures

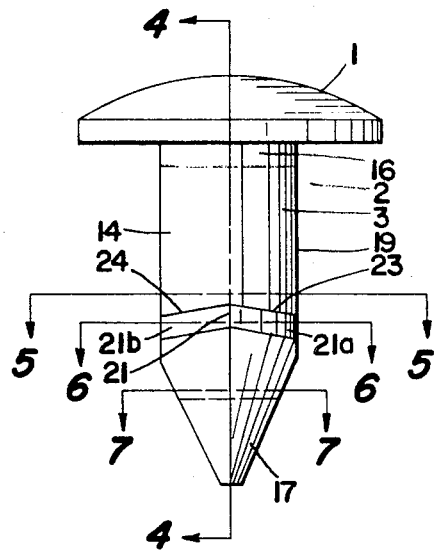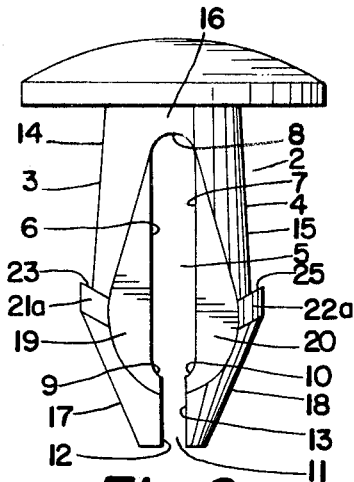
Fig. 1
Fig. 2
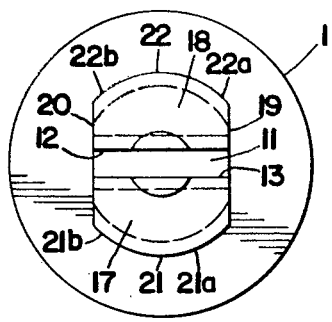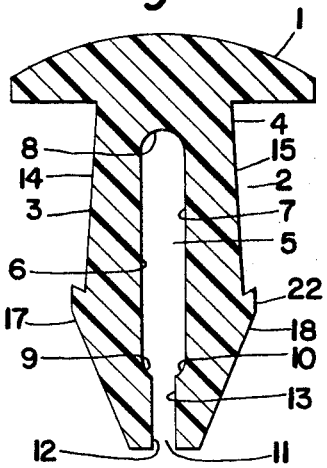
Fig. 3
Fig. 4
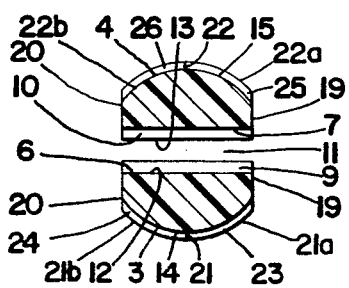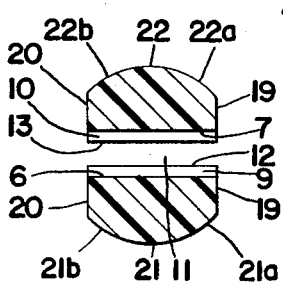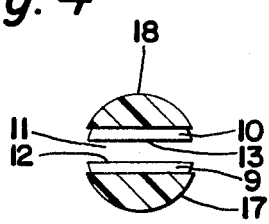
Fig. 5
Fig. 6
Fig. 7
INVENTOR.
JEROME T. SCHUPLIN
BY
*Isler & Ornstein*
ATTORNEYS Patented Sept. 4, 1973

INVENTOR.
JEROME T. SCHUPLIN
BY
Isler & Ornstein
ATTORNEYS

PLASTIC RIVET

The present invention relates, as indicated, to a plastic rivet.

The invention has, as its primary object, the provision of a rivet of the character described, which is especially useful for connecting panels together, and which is of such construction as to greatly facilitate entry of the shank of the rivet into and through aligned openings in the panels.

Another object of the invention is to provide a rivet of the character described, having construction features which are effective to provide increased holding power for resisting efforts to remove the rivet from the panels or to separate the panels from each other.

A further object of the invention is to provide a rivet of the character described, which is of such construction as to facilitate molding of the rivet.

Other objects and advantages of my invention will be apparent during the course of the following description.

In the accompanying drawings forming a part of this specification, and in which like numerals are employed to designate like parts throughout the same, FIG. 1 is a side elevational view of the plastic rivet;

FIG. 2 is a side elevational view of the rivet, as viewed from the right side of FIG. 1;

FIG. 3 is a bottom plan view of the rivet;

FIG. 4 is a vertical cross-sectional view, taken on the line 4—4 of Fig. 1;

FIG. 5 is a transverse cross-sectional view, taken on the line 5—5 of Fig. 1;

FIG. 6 is a transverse cross-sectional view, taken on the line 6—6 of Fig. 1;

FIG. 7 is a transverse cross-sectional view, taken on the line 7—7 of Fig. 1;

Figure 8:
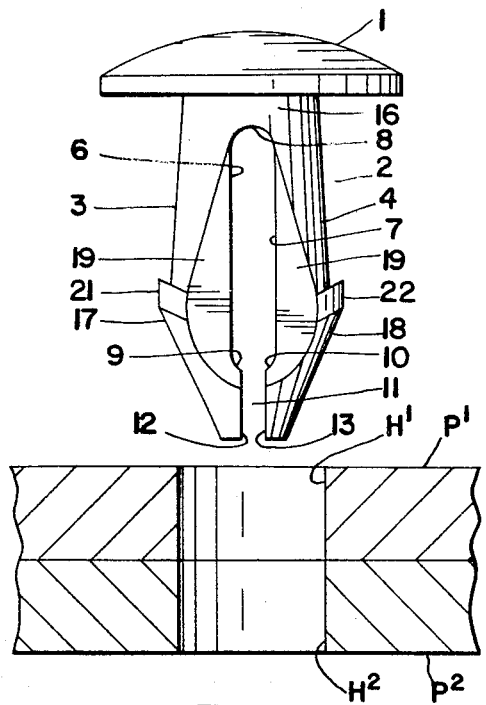
FIG. 8 is a view showing the first step in inserting the rivet into aligned openings in a pair of panels for the purpose of securing the panels together.

Referring more particularly to FIGS. 1 to 7 of the drawings, the rivet will be seen to comprise a circular domed head 1, and a shank generally indicated by reference numeral 2 extending axially therefrom.

The rivet is of unitary, one-piece construction made from a polymeric material, such as nylon, or the like, which may be easily produced in quantity or mass production by conventional extrusion, molding or other similar forming methods, as well known in this art.

For purposes of clarity in understanding the invention, the drawings are drawn to a scale of about five times the actual size of a typical rivet made in accordance with the invention.

The shank 2 comprises spaced legs 3 and 4 forming an elongated slot or opening 5 therebetween, which extends from a point slightly below the head 1 to a point near the lower end of the rivet, and is defined by parallel side walls 6 and 7, an arcuate end wall 8, and arcuate end walls 9 and 10. The width of this slot or opening 5, i.e., the distance between the walls 6 and 7, is approximately 0.062 inch.

Below the end walls 9 and 10, the space between the legs 3 and 4 is narrowed to provide a space or opening 11, which extends to the end of the shank, and which is defined by parallel side walls 12 and 13 which lie in planes parallel with the planes of the side walls 6 and 7. The width of the space 11, i.e., the distance between the walls 12 and 13, is approximately 0.031 inch, or half the width of the opening 5.

The upper portions of the legs 3 and 4 are also defined respectively by exterior surfaces 14 and 15, which are portions of the frustum of a cone having a diameter of about 0.182 inch at the top of the frustum, and a diameter of about 0.192 inch at the base, or bottom of the frustum, these surfaces 14 and 15 being interconnected at their upper ends by surfaces 16 which are also portions of the frustum of the cone.

The legs 3 and 4 are formed at their lower ends into barbs or tips which are defined respectively by exterior surfaces 17 and 18, which are portions of a frustum of a cone which is in inverted relation to the cone which defines the surfaces 14, 15 and 16. This latter frustum has a diameter of about 0.240 inch at the top and a diameter of about 0.031 inch at the bottom.

The legs 3 and 4 are further defined by parallel flat side walls 19 and 20, which lie in planes perpendicular to the walls 6, 7, 12 and 13, and which intersect the surfaces 14, 15, 17 and 18. The walls 19 and 20 also lie in planes parallel with the axis of the shank 2, equidistant from said axis.

It may be further noted at this point that the distance between the surfaces 19 and 20 is substantially 0.182 inch, which corresponds with the diameter of the top of the cone frustum which defines the exterior surfaces 14 and 15 of the rivet.

As best seen in FIGS. 1, 2, 4 and 5, the upper ends of the lower portions or barbs of the shank are molded or shaped to provide surfaces 21 and 22 which are portions of a cylinder of the diameter (0.240 inch) of the top of the inverted cone which defines the surfaces 17 and 18, the surfaces 21 and 22 being concentric with the axis of the shank.

As best seen in FIGS. 1 and 5, the surface 21 consists of two portions 21a and 21b, which slope downwardly in opposite directions from the section line 4—4, and extend to the walls or surfaces 19 and 20 respectively, this angling being for a purpose to be presently described. The surface 22, as seen in FIG. 5, similarly consists of two portions 22a and 22b, which slope downwardly in opposite directions and extend to the walls or surfaces 19 and 20, respectively.

The upper ends of the lower portions or barbs of the shank are also molded or shaped to provide shoulders or lands 23, 24, 25 and 26. The shoulder 23 extends from the upper edge of the portions 21a of the surface 21 inwardly, at an angle of about 60° to the surface portion 21a and to the surface 14. The shoulder 24 extends from the upper edge of the portion 21b of the surface 21 inwardly, at an angle of about 60° to the surface portion 21b, and to the surface 14. The shoulder 25 extends from the upper edge of the portion 22a of the surface 22 inwardly, at an angle of about 60° to the surface 22a, and to the surface 15. The shoulder 26 extends from the upper edge of the portion 22b of the surface 22 inwardly, at an angle of about 60° to the surface portion 22b, and to the surface 15. The reason for this angling or inward sloping of the shoulders 23, 24, 25 and 26 will be presently described.

It may be further noted that in the particular rivet which has been described, the diameter of the head 1 of the rivet is about 0.420 inch, the depth of the head is about 0.093 inch, the distance between the head and the upper ends of the surfaces 21 and 22 is about 0.250 inch, and the overall length of the shank is about 0.475 inch.

The manner in which the rivet is used to join or connect two panels $P^1$ and $P^2$ is depicted in FIGS. 8, 9, 10 and 11.

Referring more particularly to thse figures, the panels are provided with aligned circular openings or holes $H^1$ and $H^2$. These holes, when used for the reception of a rivet of the dimensions described, are of a diameter of about 0.187 inch, which (substantially midway between the diameter)(0.182 inch) of the top of the cone frustrum in which the surfaces 14, 15 and 16 lie, and the diameter (0.192 inch) of the bottom of that cone frustrum.

In FIG. 8, the rivet is shown in its unstressed condition about to be pushed into the holes $H^1$ and $H^2$.

Figure 9:
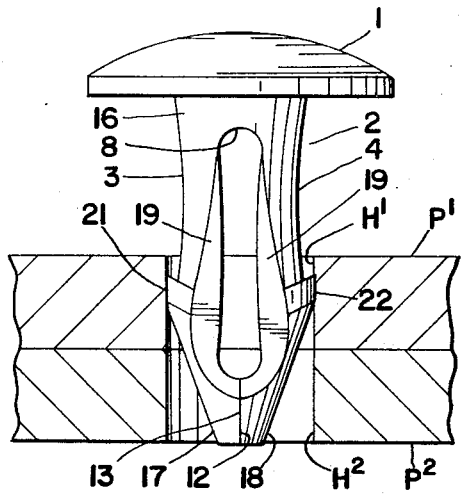
FIG. 9 is a view similar to Fig. 8, but showing the second step in inserting the rivet in the panel openings.

In FIG. 9, the conical surfaces 17 and 18 of the shank have been cammed inwardly by the upper edge of the hole $H^1$ in the panel $P^1$, and the surfaces 21 and 22 have likewise been moved by the upper edge of the hole $H^1$ in a radially-inboard direction, causing the walls 12 and 13 of the space or opening 11 to come into abutment with each other, while, at the same time, the upper portions of the legs 3 and 4 of the shank are bowed or flexed toward each other so as to facilitate sliding of the legs through the holes $H^1$ and $H^2$. It may be noted, in this connection, that even when the walls 12 and 13 are in abutment with each other, the distance between the surfaces 21 and 22 is still about 0.209 inch (0.240 inch minus 0.031 inch), so that but for this bowing or flexing of the upper portions of the legs 3 and 4, it would be difficult to push the shank of the rivet through the holes $H^1$ and $H^2$, which are of a diameter of only 0.187 inch. This pushing of the shank of the rivet through these holes is further facilitated by reason of the provision of the flat surfaces 19 and 20, and the flexibility provided by the portions of the shank between the surfaces 21 and 22 and the shoulders 23, 24, 25 and 26.

Figure 10:
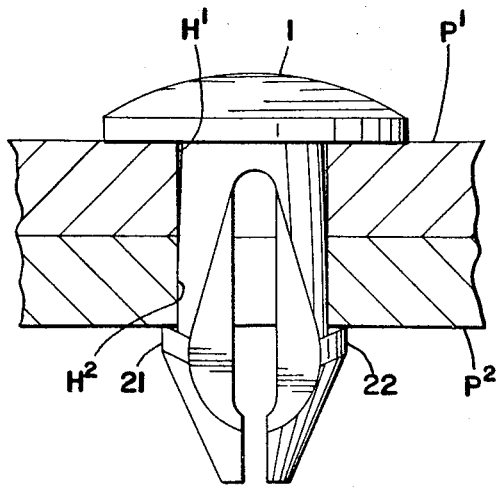
FIG. 10 is a view similar to Fig. 9, but showing the rivet in its final position in the panel openings.

In FIG. 10, the rivet is shown with its shank completely pushed into the holes $H^1$ and $H^2$, and with the upper edges of the surfaces 21 and 22 in locking engagement with the undersurface of the panel $P^2$ adjacent the hole $H^2$, this engagement being effected as a result of the inherent resiliency of the lower portions of the legs 3 and 4 of the shank, which causes them to be restored to their initial position, as shown in FIGS. 3 and 8.

Figure 11:
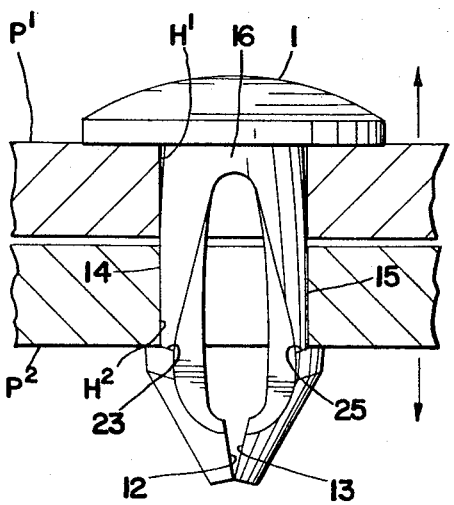
FIG. 11 is a view similar to Fig. 10, but showing the effect on the rivet of forces tending to remove the rivet from the panel openings or to separate the panels from each other.

In FIG. 11, it will be noted that any force tending to remove the rivet from the holes $H^1$ and $H^2$, or to separate the panels $P^1$ and $P^2$ from each other, will cause the shoulders 23, 24, 25 and 26 to exert pressure against the undersurface of the panel $P^2$, causing the walls 12 and 13 to again come into abutment with each other, while, at the same time, the surfaces 14, 15 and 16 are forced tightly against the walls of the holes $H^1$ and $H^2$, thereby resisting any efforts to remove the rivet or separate the panels from each other, and greatly increasing the holding power of the rivet.

The angling of the portions of the surfaces 21 and 22 relatively to each other, and the corresponding angling of the shoulders, is of advantage in that it facilitates removal of the rivet from the mold in which it is molded, considering the plane of the section line 4—4 of FIG. 1 as the mold parting plane or line.

The provision of the cylindrical surfaces 21 and 22 eliminates a sharp knife edge which would otherwise be formed at the junction between the conical surfaces 17 and 18 and the shoulders 23, 24, 25 and 26, which might be wiped or cut off by the upper edge of the hole $H^1$ during insertion of the rivet in this hole.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a plastic rivet of the character described, a head, a shank extending from said head, said shank comprising spaced legs forming an elongated slot or opening therebetween extending from said head to a point spaced from the end of said shank, said legs being defined, in part, by flat surfaces lying in planes substantially perpendicular to the walls of said slot or opening, and parallel with the axis of said shank, the upper portions of said legs being further defined by conical surfaces which are intersected by said flat surfaces, and the lower portions of said legs being further defined by conical surfaces which are intersected by said flat surfaces and which are in inverted relation to said first-named conical surfaces, said shank having a second slot which extends from said point to the end of the shank and which is substantially narrower than said first slot, shoulders or lands provided at the junction between said first and second conical surfaces, said shoulders or lands extending circumferentially of said conical surfaces, each shoulder or land consisting of angularly related portions sloped or inclined downwardly in a direction away from said head, said shank being provided at the upper ends of said second-named conical surfaces with cylindrical surfaces which are concentric with the axis of said shank, each of said cylindrical surfaces consisting of portions which are angularly related to each other and extend to said flat surfaces.

2. A rivet, as defined in claim 1, wherein said shoulders are inclined downwardly and inwardly toward said first-named conical surfaces.

3. In a plastic rivet of the character described, a head, a shank extending from said head, said shank comprising spaced legs forming an elongated slot or opening therebetween extending from said head to a point spaced from the end of said shank, said legs being defined, in part, by flat surfaces lying in planes substantially perpendicular to the walls of said slot or opening, and parallel with the axis of said shank, the upper portions of said legs being further defined by conical surfaces which are intersected by said flat surfaces, and the lower portions of said legs being further defined by conical surfaces which are intersected by said flat surfaces and which are in inverted relation to said first-named conical surfaces, said shank having a second slot which extends from said point to the end of the shank and which is substantially narrower than said first slot, shoulders or lands provided at the junction between said first and second conical surfaces, said shoulders or lands extending circumferentially of said conical surfaces, each shoulder or land consisting of angularly related portions sloped or inclined downwardly in a direction away from said head, said shank being provided at the upper ends of said second-named conical surfaces with cylindrical surfaces which are concentric with the axis of said shank and extend to said flat surfaces.

4. A rivet, as defined in claim 3, wherein said shoulders are inclined downwardly and inwardly toward said first-named conical surfaces.

* * * * *